Figure 1:
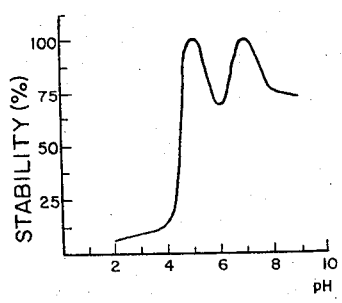

ULTRAVIOLET ABSORPTION SPECTRUM

Dec. 20, 1966  NOBUHIRO YAMADA ET AL  3,293,142
α-AMYLASE AND THE PRODUCTION THEREOF
Filed June 18, 1964  2 Sheets-Sheet 2

INVENTORS
NOBUHIRO YAMADA
KATSUMI TOMODA

BY, Wenderoth, Lind & Ponack
ATTORNEYS

United States Patent Office 3,293,142
Patented Dec. 20, 1966

3,293,142
α-AMYLASE AND THE PRODUCTION THEREOF
Nobuhiro Yamada, Takarazuka, and Katsumi Tomoda, Toyonaka, Japan, assignors to Takeda Chemical Industries, Ltd., Osaka, Japan
Filed June 18, 1964, Ser. No. 376,051
Claims priority, application Japan, June 22, 1963, 38/33,245
2 Claims. (Cl. 195—62)

This invention relates to a method for the production of a novel α-amylase which is useful in the food industry as well as for medicinal use as a digestive.

It is well known that there are many organisms which produce α-amylases, and among them are black aspergilli. The limit of hydrolysis of starch by any of the known α-amylases which are produced by known black aspergilli is from about 40 to 60 percent, but an α-amylase which is higher in the extent of its starch hydrolysis is required in the food and the medicinal industries.

The present invention is based upon the finding that a strain of black aspergillus, isolated from soil at Osaka, Japan, can produce and accumulate a novel α-amylase abundantly in its culture broth.

The principal object of the present invention is therefore to provide a process for producing a novel and useful α-amylase which shows a high value, of above 95 percent, in its limit of starch hydrolysis.

Another object of this invention is to provide an α-amylase which is novel and useful in the food industries and for medicinal purposes as a digestive owing to its exhaustive hydrolysis of starch.

The first object is realized by the culture of the aforesaid organism of the group of black aspergilli, isolated from soil as stated and named Y-78, in an appropriate culture medium containing assimilable carbon source, digestible nitrogen source and other necessary nutrients for the growth of Y-78, and by recovering from the resulting broth the α-amylase produced.

The mycological properties of Y-78 on Czapek-Dox agar are as follows:

Colony ---------------- Black brown.
Perithecium ----------- Not formed.
Ascospore ------------- Not formed.
Vesicle --------------- Globose to oval.
Sterigma -------------- Having ramuli.
Conidium -------------- Dark brown, globose to oval.

and it assimilates nitrite strongly.

For the incubation of Y-78, there may be employed generally-known means applicable to the incubation of aspergilli, for example, solid culture using wheat bran, static culture using liquid culture medium, shaking culture and submerged culture.

As the assimilable carbon source, one or more of soluble starch, glucose, maltose, sucrose and any other suitable carbohydrate may be used, and as digestible nitrogen source, organic compounds or materials such as cornsteep liquor, wheat bran, yeast extract, meat extract, peptone, casein and urea, and/or as inorganic nitrogen source, for example, inorganic nitrates such as sodium nitrate and potassium nitrate or inorganic ammonium salts such as ammonium sulfate, ammonium carbonate, ammonium phosphate and ammonium nitrate may be used. Inorganic salts, for example, sodium salts, potassium salts, calcium salts, magnesium salts and phosphates may desirably be used.

When known black aspergilli are cultured for the production of amylase, the pH of the culture broth after about 1 day of the culture shifts to a strongly acidic pH. In the case of the strain Y-78 the pH of the culture broth in the course of the culture remains approximately constant, or shifts downward slightly, if any, and soon shifts back toward neutral.

The changes of the pH in the culture broth of Y-78 as compared with known black aspergilli are shown in Table 1.

TABLE 1

| Culture period (hours) | 0 | 24 | 42 | 66 |
|---|---|---|---|---|
| pH of the culture medium: | | | | |
| Known black aspergilli | 5.4 | 2.2 | 2.2 | 2.2 |
| Y-78 | 4.5 | 4.5 | 4.7 | 5.5 |

Therefore, according to the process of the present invention, the new α-amylase of high activity is accumulated in the culture broth with the adjustment of only the initial pH of the culture medium, desirably to about pH 4.5, without the complicated operation of controlling the pH of the culture broth in the course of the culture. This is one of the predominant features of this invention over the use of known black aspergilli.

It is desirable to select or control the conditions so that the activity of the α-amylase produced by Y-78 in the culture broth may be maximum. When a submerged culture is used for the production of the α-amylase of the present invention, it is preferable to culture Y-78 in liquid medium at a temperature of 20 to 35° C., especially 25 to 30° C., for about 3 to 8 days, preferably 5 to 6 days. The most preferable conditions for the culture are determined in accordance with the constitution of the medium, the aeration rate, etc. In the culture broth thus obtained, the α-amylase of the present invention is accumulated. When a liquid medium is used, most of the accumulated α-amylase is contained in the liquid part of the culture broth, and therefore the α-amylase in the liquid part of the culture broth is desirably recovered from supernatant obtained by centrifuging or from the filtered broth.

Conventional means for recovering enzymes from their culture can suitably be applied to the recovery of the α-amylase, with adequate consideration being given to the properties of the same.

For example, a culture filtrate obtained after liquid culture or a solution extracted from a solid culture medium is subjected to means such as salting out by the addition of a salt such as ammonium sulfate or sodium sulfate to the solution, precipitation by the addition of an appropriate hydrophilic organic solvent such as methanol, acetone or the like or acrinol, dialysis with semipermeable membrane such as cellulose-casing, parchment paper or bladder membrane, electric dialysis, electrophoresis and treatment with ion exchange resin; and combinations of these expedients may be effected for the purpose of recovery and purification.

The α-amylase thus obtained is stable in the broad range of from acidic to alkaline pH value. For example, the enzymatic activity of the α-amylase, accumulated in a liquid culture medium consisting of cornsteep liquor as the nitrogen source and soluble starch as the carbon source, in which Y-78 is incubated, decreases to 50 percent of the original when it is allowed to stand for 30 minutes under the conditions of pH 2.5 and 37° C. and to from 70 to 80 percent when it is left overnight under the conditions of pH 10 and 37° C. Under these conditions, generally-known amylases lose all or substantially all of their activities.

Figure 2:
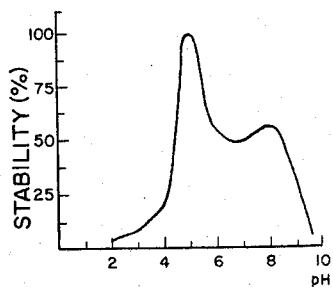

The stability in the pH range from 2 to 10 of the α-amylase produced by Y-78 is shown in FIG. 1 and is better, especially above pH about 6, than those of known aspergilli, a typical one of which is shown in FIG. 2.

The stabilities shown in FIG. 1 and FIG. 2 are tested at 37° C. for overnight.

The properties of the α-amylase thus obtained are compared with those of known α-amylases in Table 2.

TABLE 2

| Origin of α-amylase | Y-78 | Known black aspergilli |
|---|---|---|
| Property: | | |
| Acid resistance | Strong | Strong. |
| Alkali resistance | Very strong | Very weak. |
| Dextrinogenic activity | Strong | Strong. |

The α-amylase thus obtained is purified by suitably applying generally known means for the separation or the purification of enzymes from crude enzyme preparations such as salting out, precipitation by the addition of organic solvents, treatment with specific precipitants for proteins, treatment with resins, dialysis and electrophoresis.

Y-78 produces not only the novel α-amylase but also other kinds of enzymes as by-products. And therefore the α-amylase preparation is usually obtained as a mixture with the other kinds of enzymes which are regarded as by-products. This mixture is obtained from the liquid part of the culture broth or culture extracts by means of, for example, salting out by the addition of inorganic salts, or precipitation by the addition of hydrophilic organic solvents. The mixture, thus obtained, may also be used for the appropriate purposes. Enzymes produced as by-products by Y-78 and by known black aspergilli are shown in Table 3.

TABLE 3

| Origin of enzyme | Y-78 | Known black aspergilli |
|---|---|---|
| Enzyme: | | |
| Acid protease | Abundant | Present. |
| Carboxymethylcellulase | ----do---- | Do. |
| Glucanase | ----do---- | Do. |

The purified α-amylase which is separated from other enzymes is quite different from known α-amylases and hydrolyzes a trisaccharide such as panose having α-1.4 and α-1.6 linkages.

The following examples set forth presently-preferred exemplary embodiments of the present invention, they are intended to be solely illustrative, however, and not at all limitative of the invention. In the examples, the abbreviation "° C." means degrees centigrade and percentages are on the weight basis unless otherwise noted. "ATCC" refers to American Type Culture Collection, Rockville, Maryland.

*Example 1*

Y-78 (ATCC-15475) is inoculated into the liquid culture medium of pH 4.5 which consists of 2.4 percent of soluble starch, 3.6 percent of cornsteep liquor, 4.7 percent of sodium dihydrogenphosphate (2 hydrate), 0.1 percent of calcium chloride (2 hydrate), 0.02 percent of potassium chloride, 0.02 percent of magnesium chloride (6 hydrate) and 5.7 grams per liter of soybean oil as antifoaming agent, and is then cultured for 6 days under agitation and aeration at a temperature of 25 to 30° C. At the end of the culture period, mycelia are plentifully grown and the amount of amylase in the medium reaches its maximum. The culture broth is filtered to give a filtrate. Ammonium sulfate is added to the filtrate to the degree of saturation of 0.8 to effect enzyme precipitation. The enzymatic activities of the enzyme precipitate at pH 4.5 are:

Dextrinogenic activity, DU/milligram _____ 900
Saccharogenic activity, GU/milligram _____ 36

For dextrinogenic power evaluation, 1 milliliter of 10 micromole glucose units per milliliter of soluble starch solution, 1 milliliter of acetate buffer, and 1 milliliter of enzyme solution are mixed in a test tube. The reaction is allowed to proceed for 10 minutes at 37° C. and is stopped by the addition of 3 milliliters of acidic iodine solution. The absorption is read at the wavelength of 720 millimicrons.

For the evaluation of saccharogenic activity, the enzymation is carried out as above, and the increase in reducing sugar is determined by a modification of the Somogyi-Nelson method (cf. J. Biol. Chem., 195, 19 (1952)).

The enzymatic activities which decompose 10 percent of the substrate at pH 4.5 as determined by the diminution of iodine starch reaction or by the increase in the amount of reducing sugar by the analytical conditions stated above are taken as the amylase units, and they are expressed as 1DU and 1GU, respectively.

*Example 2*

Y-78 (ATCC-15475) is inoculated into the liquid culture medium of pH 4.5 which consists of 2.4 percent of soluble starch, 3.6 percent of cornsteep liquor, 4.6 percent of sodium dihydrogenphosphate (2 hydrate), 0.1 percent of calcium chloride (2 hydrate), 0.02 percent of potassium chloride, 0.02 percent of magnesium chloride (6 hydrate) and 5.7 grams per liter of soybean oil as antifoaming agent, and is then cultured for 7 days under agitation and aeration at 28° C. At the end of the culture period, mycelia are plentifully grown and the amount of amylase accumulated in the medium reaches its maximum. The enzymatic activities of the enzyme in the culture broth are:

Dextrinogenic activity, DU/milliliter _____ 9920
Saccharogenic activity, GU/milliliter _____ 158

The culture broth is filtered to separate a filtrate. Precipitates, obtained by the addition of ammonium sulfate to the filtrate to the degree of saturation of 0.8, are collected and dried to give enzyme powder. The enzymatic activities of the enzyme powder are:

Dextrinogenic activity, DU/milligram _____ 2740
Saccharogenic activity, GU/milligram _____ 83

*Example 3*

Y-78 (ATCC-15475) is inoculated into the liquid culture medium at pH 4.5 which consists of 9.6 percent of soluble starch, 14.4 percent of cornsteep liquor, 4.7 percent of sodium dihydrogenphosphate (2 hydrate), 0.1 percent of calcium chloride (2 hydrate), 0.02 percent of potassium chloride, 0.02 percent of magnesium chloride (6 hydrate) and 5.7 grams per liter of soybean oil as antifoaming agent, and the cultured for 6 days under agitation and aeration at a temperature between 25 and 30° C. At the end of the culture, mycelia are plentifully grown and the amount of amylase accumulated in the medium reaches its maximum. The culture broth is filtered to give a filtrate. Precipitates, obtained by the addition of ammonium sulfate to the filtrate to the degree of saturation of 0.8 are collected and dried to give enzyme powder. The enzymatic activities of the enzyme powder are:

Dextrinogenic activity, DU/milligram _____ 2700
Saccharogenic activity, GU/milligram _____ 89

*Example 4*

Y-78 (ATCC-15475) is inoculated into 30 liters of culture medium, the composition of which is the same as that used in Example 3, and then cultured for 7 days at 28° C. The culture broth is filtered to give a filtrate. Ammonium sulfate is added to the degree of 0.8 saturation to the filtrate and the filtrate is allowed to stand overnight. Resulting precipitates are collected and dried to give 125 grams of enzyme powder.

Example 5

Enzyme powder prepared by the method described in Example 4 is dissolved in an appropriate volume of water and dialyzed in running water at 5° C. to remove salts. Precipitates, obtained by the addition of ammonium sulfate to the dialyzed enzyme solution in a degree of saturation between 0.4 and 0.6, are collected and dissolved in water and then dialyzed in running water to remove salts completely. Precipitates, resulting from the addition of 3 percent by weight of acrinol to the dialyzed enzyme solution, are separated by centrifuging and then dissolved in a small amount of acetate buffer solution of pH 5.8 in the concentration of 1 mole per liter. Acrinol in the acetate buffer solution is adsorbed on to terra alba when the latter is mixed with the acetate buffer solution, and the acrinol adsorbed on the terra alba is separated by centrifuging. This procedure is repeated until the yellowish color of acrinol in the acetate buffer solution vanishes. To the solution containing enzyme and free from acrinol is added acetone, and the precipitates obtained at between 40 to 60 percent of concentration of acetone are collected. The precipitates are dissolved in a phosphate buffer solution of pH 7.0 in the concentration of 0.01 mole per liter, and the solution is allowed to pass through a column of diethylaminoethylcellulose ion exchanger, which has been pretreated with the buffer solution of the same constitution as above used. From the eluate, fractions showing α-amylase activity are collected. The fractions contain the purified enzyme produced by Y-78. The amylase activity of the purified enzyme thus obtained is 43,000 DU/milligram. It is found that about 40 percent of the α-amylase activity in the culture broth is preserved in the purified enzyme and the specific activity, per milligram of protein, of the purified enzyme is about 40 times as high as that of the culture filtrate.

The purified enzyme thus obtained shows the following properties:

(1) Its uniformity is confirmed through electrophoresis by Tiselius' apparatus, where 62 milligrams of purified enzyme in phosphate buffer ($\mu$=0.1) of pH 6.05 is subjected to an electric field of 82 volts for 120 minutes.

(2) Its optimum pH is 5.0 and its optimum temperature is 45 to 50° C.

(3) It is stable in the pH range from 6 to 9 when it is allowed to stand overnight at 37° C., and loses its activity at pH 8.0 by heating at 70° C. for 30 minutes.

(4) The amount of reducing sugar produced by reacting it with starch as substrate to the achroic point is equal, in its reducing power, to 15 percent of the total amount of glucose that would be produced by the complete hydrolysis of the substrate. This fact shows that the purified enzyme is an α-type amylase.

(5) It hydrolyzes amylose, amylopectin and glycogen as substrates almost to glucose and its limit of hydrolysis of the said substrates is higher than 95 percent.

(6) The properties of the α-amylase which is produced by Y-78 and purified by the method in Example 5 are compared with those of known α-amylases in Table 4.

(7) The elementary analysis of the α-amylase

|      | C, percent | H, percent | N, percent |
|------|------------|------------|------------|
| (1)  | 50.43      | 6.78       | 13.21      |
| (2)  | 49.48      | 7.45       | 13.18      |

Figure 3:
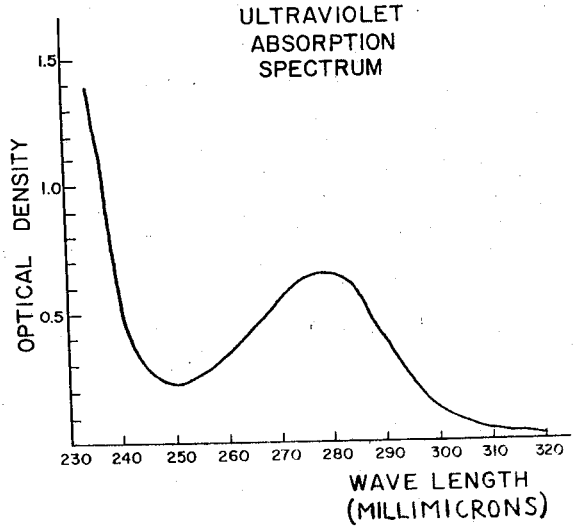

(8) Its ultraviolet absorption spectrum shows the typical curve of a protein which has the maximum absorption at the wave length of 277–280 millimicrons, as indicated in FIG. 3 of the drawings.

Figure 4:
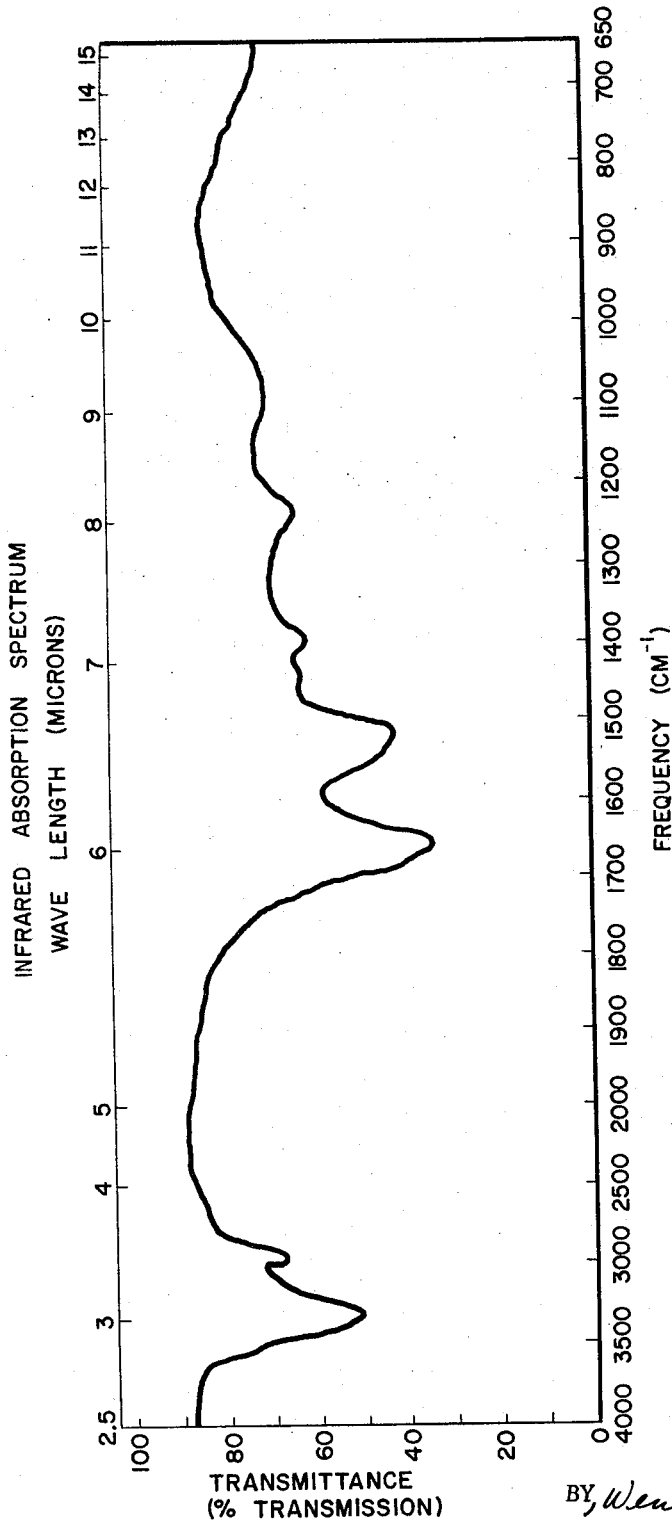

(9) The infrared absorption spectrum of the α-amylase is shown in FIG. 4 and the significant absorption bands in microns are as follows:

3.0 (strong)
3.44 (middle)
6.04 (broad, strong)
6.58 (broad, strong)
6.92 (weak)
7.19 (broad, weak)
8.13 (middle)
9.35 (broad, weak)

(10) It is easily soluble in water but insoluble in an organic solvent such as methanol, ethanol, acetone, ether, benzene, petroleum ether.

TABLE 4

| Origin of α-amylase | Bacillus subtilis | Aspergillus niger, Aspergillus oryzae | Endomycopsis | Y-78 |
|---|---|---|---|---|
| Action: | | | | |
| Limit of starch decomposition (percent) | 35 | 48 | 50–98 | 95–100 |
| Decomposition of panose | (1) | (1) | (1) | (2) |
| Maltase 3 activity | (1) | (1) | (4) | (4) |

[1] Negative.
[2] Very strong.
[3] This change made at American Consulate General, Osaka, Japan, June 15, 1964.
[4] Strong.

Having thus disclosed the invention, what is claimed is:

1. A method for producing α-amylase, which comprises incubating black aspergillus Y-78 (ATCC-15475) in a nutrient culture medium containing assimilable carbon source and digestible nitrogen source, at an initial pH of about 4.5 and at a temperature of about 20° to 35° C. under aerobic conditions until the α-amylase is substantially accumulated in the culture broth, and recovering the accumulated α-amylase therefrom;

2. α-Amylase, metabolite of black aspergillus Y-78 (ATCC-15475), which has the following properties:
   (1) its optimum pH for activity is about 5.0 and its optimum temperature for 10 minutes of enzymation at the optimum pH is from 45 to 50° C.;
   (2) it is stable in the pH range from about 6 to 9 when it is allowed to stand at 37° C. overnight, and loses its activity at pH 8.0 by heating at 70° C. for 30 minutes;
   (3) its limit of starch decomposition is 95–100%;
   (4) it has a strong decomposition action on panose, and a strong maltase activity;
   (5) it hydrolyzes amylose, amylopectin and glycogen as substrates almost to glucose and its limit of hydrolysis of the said substrates is higher than 95 percent;
   (6) its elementary analysis is C 49.98 to 50.43%, H 6.78 to 7.45%, and N 13.18 to 13.21%;
   (7) its ultraviolet absorption spectrum is as shown on FIG. 3 of the accompanying drawings with a maximum absorption at the wave length of 277–280 millimicrons;
   (8) its infrared absorption spectrum is as shown on FIG. 4, with the following significant absorption bands (in microns):
      3.0 (strong)
      3.44 (middle)
      6.04 (broad, strong)
      6.58 (broad, strong)

6.92 (weak)
7.19 (broad, weak)
8.13 (middle)
9.35 (broad, weak);

(9) it is easily soluble in water but insoluble in an organic solvent such as methanol, ethanol, acetone, ether, benzene, petroleum ether.

References Cited by the Examiner
UNITED STATES PATENTS
3,063,911  11/1962  Tanaka et al. ......... 195—62

A. LOUIS MONACELL, *Primary Examiner.*
L. M. SHAPIRO, *Assistant Examiner.*